(12) United States Patent
Reif

(10) Patent No.: US 9,021,905 B2
(45) Date of Patent: May 5, 2015

(54) DRIVING DEVICE

(75) Inventor: Thomas Reif, Kobern-Gondorf (DE)

(73) Assignee: Stabilus GmbH, Koblenz (DE)

(*) Notice: Subject to any disclaimer, the term of this patent is extended or adjusted under 35 U.S.C. 154(b) by 711 days.

(21) Appl. No.: 13/091,522

(22) Filed: Apr. 21, 2011

(65) Prior Publication Data

US 2011/0271776 A1 Nov. 10, 2011

(30) Foreign Application Priority Data

May 5, 2010 (DE) .......................... 10 2010 019 344

(51) Int. Cl.
*F16H 25/08* (2006.01)
*B60J 5/10* (2006.01)
*E05F 15/12* (2006.01)

(52) U.S. Cl.
CPC .............. *B60J 5/101* (2013.01); *E05F 15/124* (2013.01); *E05Y 2201/21* (2013.01); *E05Y 2201/636* (2013.01); *E05Y 2201/702* (2013.01); *E05Y 2800/232* (2013.01); *E05Y 2900/546* (2013.01); *E05Y 2800/22* (2013.01)

(58) Field of Classification Search
CPC ......... F16H 25/02; F16H 25/04; F16H 25/08; F16H 25/12; F16H 25/20; F16H 25/2006; F16H 25/2009; F16H 25/2018; F16H 25/2025; F16H 25/24; F16H 25/2454
USPC .............. 74/89.23, 89.3, 89.31, 89.34, 89.35, 74/89.38, 424.71; 49/339–344
See application file for complete search history.

(56) References Cited

U.S. PATENT DOCUMENTS

| 4,793,197 | A  | * | 12/1988 | Petrovsky .................... 74/89.35 |
| 4,860,987 | A  | * | 8/1989  | Werner ......................... 248/405 |
| 4,897,588 | A  | * | 1/1990  | Takei ............................ 318/661 |
| 4,899,578 | A  | * | 2/1990  | Ernst ................................. 73/82 |
| 5,353,896 | A  | * | 10/1994 | Baumgartner et al. ...... 188/71.9 |
| 6,253,632 | B1 | * | 7/2001  | Poulek .......................... 74/89.23 |
| 6,452,350 | B1 | * | 9/2002  | Finkemeyer et al. ......... 318/372 |
| 6,722,477 | B1 | * | 4/2004  | Wolfsteiner et al. ......... 188/72.9 |
| 6,880,416 | B2 | * | 4/2005  | Koch ........................... 74/89.35 |
| 7,458,292 | B2 | * | 12/2008 | Scholz ........................ 74/424.72 |
| 7,634,951 | B2 | * | 12/2009 | Frieb-Preis et al. ......... 74/89.38 |
| 8,127,634 | B2 | * | 3/2012  | Reif et al. .................... 74/89.38 |
| 8,375,814 | B2 | * | 2/2013  | Hillen et al. ................. 74/89.38 |
| 8,601,891 | B2 | * | 12/2013 | Bochen et al. ............... 74/89.38 |
| 2004/0187621 | A1 | * | 9/2004 | Hamann et al. ............ 74/424.76 |

(Continued)

FOREIGN PATENT DOCUMENTS

DE 102007029591 1/2009

*Primary Examiner* — David M Fenstermacher
(74) *Attorney, Agent, or Firm* — Cozen O'Connor

(57) ABSTRACT

A driving device for a hatch in a vehicle with a first housing part connectable to a stationary base part or a movable structural component part, a second housing part connectable to the other, of the movable structural component part and the stationary base part, a spindle drive by which the first and second housing parts are movable axially relative to one another, a rotary drive that drives the spindle drive in rotation including a motor and a gear unit accommodated in a gear unit housing, and a braking device. The spindle drive includes a threaded spindle that has a first spindle portion and a braking spindle nut that is axially movable on the first spindle portion and a second spindle portion and a working spindle nut axially movable on the second spindle portion. The braking spindle nut cooperates with the braking device for applying a holding force to the spindle drive.

9 Claims, 3 Drawing Sheets

(56) References Cited

U.S. PATENT DOCUMENTS

| | | | |
|---|---|---|---|
| 2008/0060463 A1* | 3/2008 | Bochen et al. | 74/424.76 |
| 2009/0000201 A1* | 1/2009 | Fahl | 49/280 |
| 2009/0120003 A1* | 5/2009 | Bochen et al. | 49/340 |
| 2009/0199482 A1* | 8/2009 | Arenz et al. | 49/279 |
| 2009/0199668 A1* | 8/2009 | Batosky et al. | 74/424.71 |
| 2010/0037527 A1* | 2/2010 | Bochen | 49/341 |
| 2010/0269604 A1* | 10/2010 | Fujiwara et al. | 74/89.39 |
| 2011/0271776 A1* | 11/2011 | Reif | 74/25 |

* cited by examiner

DRIVING DEVICE

BACKGROUND OF THE INVENTION

1. Field of the Invention

The invention is directed to a driving device, particularly for driving a hatch in a vehicle, with a first housing part that can be connected to a stationary base part or to a movable structural component part the movable structural component part or the stationary base part, a spindle drive by which the first housing part and second housing part are movable axially relative to one another, a rotary drive which drives the spindle drive in rotation that comprises a motor and a gear unit accommodated in a gear unit housing, and a braking device.

2. Description of the Related Art

Driving devices of the kind mentioned above are known in practice for opening and closing hatchbacks, trunk lids, engine hoods, and doors in motor vehicles. Both sides of the hatches are often driven electromechanically so that the hatches and hoods do not warp when swiveling open and closed.

Alternatively, drive systems are used that drive the hatches electromechanically in the opening and closing direction on only one side, while a gas spring is arranged on the other side of the hatch. This gas spring compensates for the weight force of the hatch and substantially reinforces only the opening of the hatch. An opening and closing system of this kind is better than the variant which is driven electromechanically on both sides and is therefore preferably installed in most applications.

However, drive systems which drive the hatches electromechanically in the opening and closing direction on only one side can also be used. DE 10 2007 029 591 A1 discloses a driving device whose holding-open force is increased by a centrifugal brake. The braking device is operative whenever the rotary drive is not in operation. However, there is also a need for driving devices in which the operation of the braking device depends upon the stroke.

SUMMARY OF THE INVENTION

It is an object of the invention to switch on and switch off a braking function applied in spindle drives in a stroke-dependent manner to increase a holding-open force.

According to one embodiment of the invention, the spindle drive comprises a threaded spindle that has a first spindle portion, a braking spindle nut that is axially movable on the first spindle portion, a second spindle portion, and a working spindle nut that is axially movable on the second spindle portion, wherein the braking spindle nut cooperates with a braking device for applying a holding force to the spindle drive.

In another embodiment, the braking device comprises two spring elements that are preloaded against one another in axial direction and receive an annular braking element between them.

The braking element advantageously has a sleeve-shaped portion on its side situated toward the longitudinal center line.

A freewheel, which surrounds the threaded spindle annularly at a certain distance, is arranged at the sleeve-shaped portion.

The threaded spindle projects coaxially into a guide tube that extends coaxially out of the first housing part at the side located opposite the base piece of the first housing part and is connected to the latter so as to be fixed with respect to rotation relative to it, at least one axial groove being provided in the guide tube, and a radial projection at the working spindle nut and a radial projection at the braking spindle nut engage in this axial groove so that a space-saving construction is achieved.

In another embodiment, a spindle nut portion with a reduced outer diameter adjoins the radial projection of the braking spindle nut in direction of the base piece of the first housing part and is bounded by a conical spindle nut portion forming the transition to a spindle nut portion whose outer diameter is greater than the outer diameter of the spindle portion.

A particularly efficient and space-saving construction is achieved when the lengths and thread pitches of the two spindle portions are selected in such a way that, in the extended position of the driving device, the working spindle nut is positioned at least almost at the free end of the second spindle portion and the threads of the braking spindle nut are positioned at the end of the first spindle portion and, in the closed position of the driving device, the respective lower end of the corresponding spindle portions, i.e., the end of the corresponding spindle portions facing the gear unit housing, is reached.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
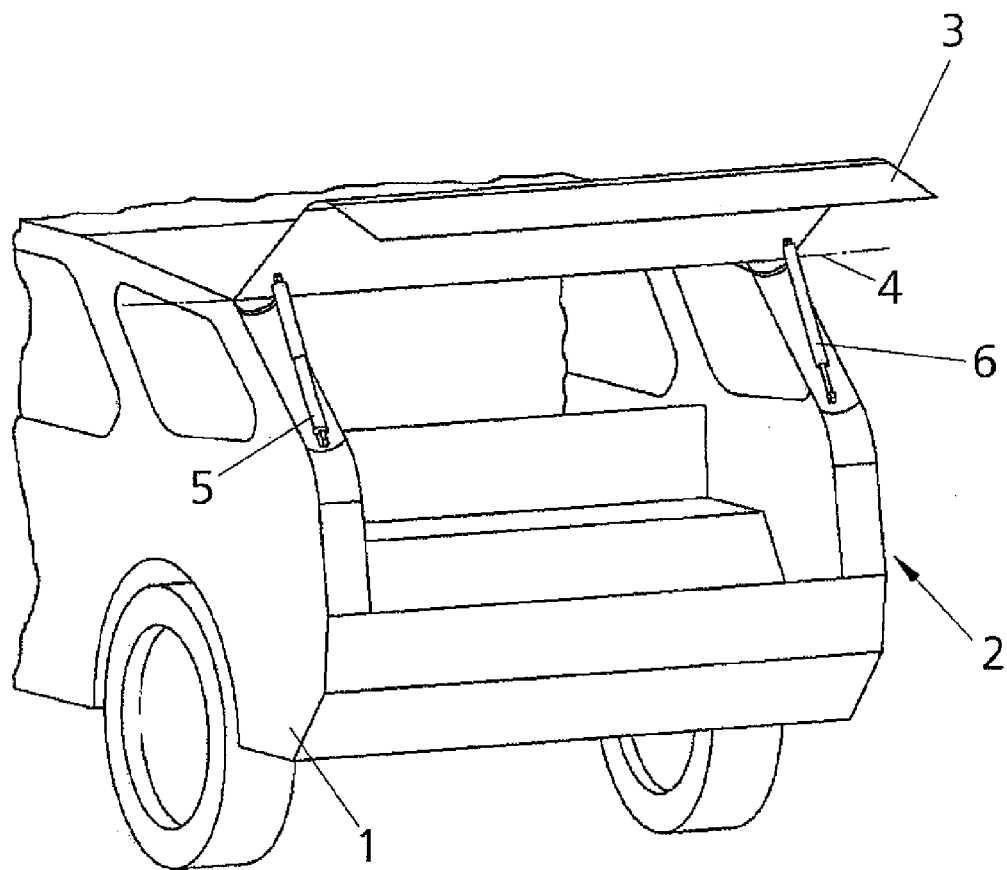
FIG. 1 is a schematic view of a motor vehicle with a rear hatch that is driven in a swivelable manner.

The schematic diagram in FIG. 1 shows a motor vehicle with a body as base part 1 and a movable structural component part 3, constructed as a rear hatch, which closes or opens an opening 2 of the base part 1.

It should be noted that the structural component part 3 which is movable relative to the base part 1 can also be a front hood or engine hood, a vehicle door, or a corresponding application.

The movable structural component part 3 is mounted at a horizontal swiveling axis 4 extending transverse to the vehicle. A first driving device 5 is arranged at one side of the movable structural component part 3. A second driving device 6 is arranged at the opposite side of the movable structural component part 3.

Figure 2:
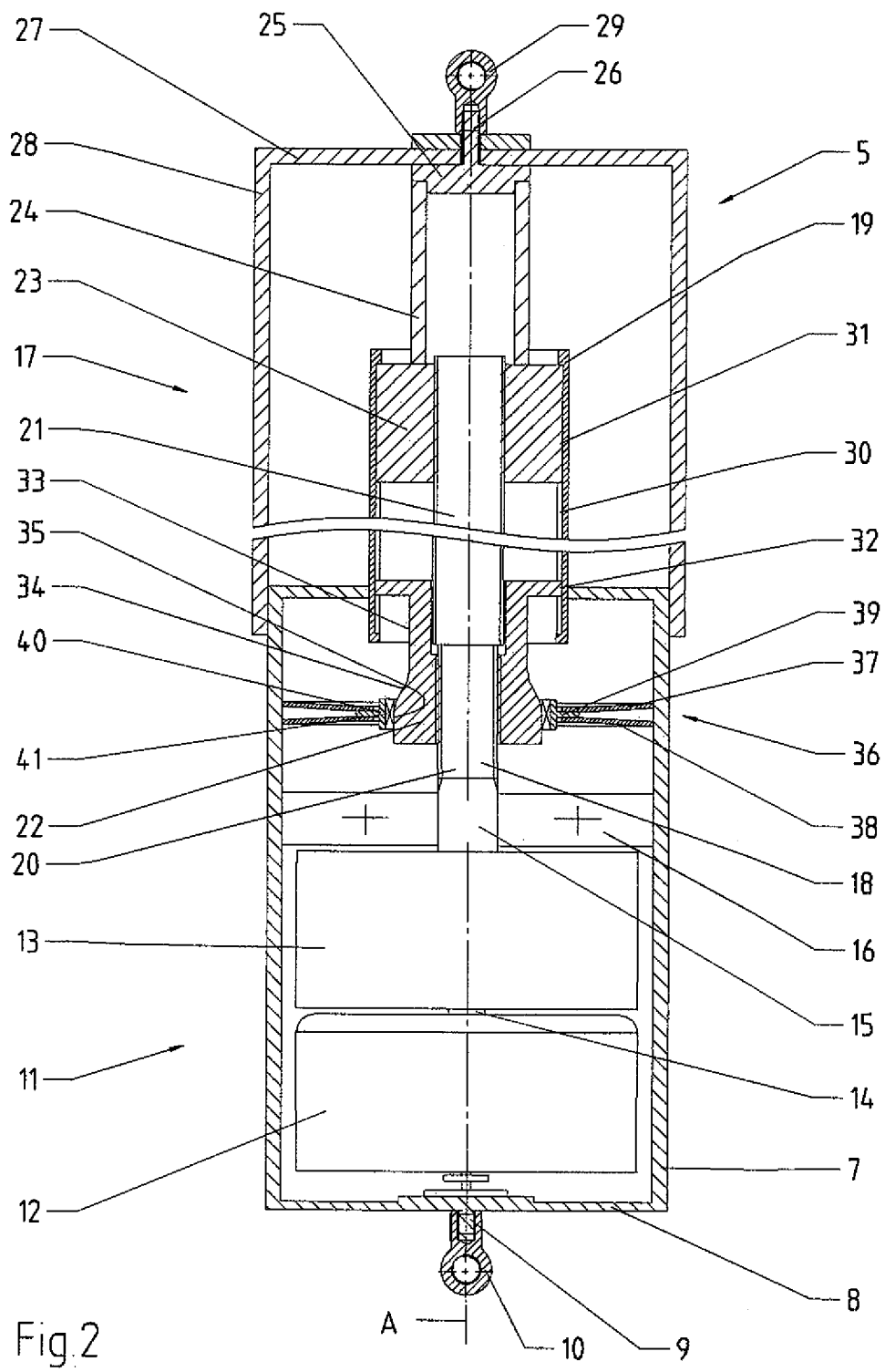
FIG. 2 is a sectional view of a driving device according to one embodiment of the invention in an extended position.

FIG. 2 is a schematic view of an embodiment form of one of the two driving devices 5, 6 in the form of an electromechanical driving device which will be associated with the first driving device 5 in the following description for the sake of simplicity.

The first driving device 5 has a tubular first housing part 7 that is closed at one end by a base piece 8. The base piece 8 has a threaded pin 9 on which a connection element 10 is screwed.

A rotary drive 11 is arranged in the interior of the housing part 7. The rotary drive 11 comprises an electric motor 12 and a gear unit, not shown in detail, which is accommodated in a gear unit housing 13. The electric motor 12 is supported at the end of the housing part 7 that is closed by the base piece 8. On the side of the electric motor 12 opposite the base piece 8, an engine driveshaft 14 extends into the gear unit housing 13 and, at the side of the gear unit housing 13 opposite the engine driveshaft 14, a gear shaft 15 extends out of the gear unit housing 13 through a bearing 16, which guides the gear shaft 15.

The end of the gear shaft 15 is connected to a spindle drive 17. The gear shaft 15 is connected to a threaded spindle 18 by an adapter element or is formed integral with it.

The threaded spindle 18 projects coaxially into a guide tube 19, which extends coaxially out of the housing part 7 on the side opposite the base piece 8 and is connected to it so as to be fixed with respect to rotation relative to it. Near the gear shaft 15, the threaded spindle 18 has a first spindle portion 20 with at least one first screw thread and a second spindle portion 21 which adjoins the first spindle portion 20 and which has at least one second screw thread, the at least one first screw thread having a smaller pitch than the at least one second screw thread.

A spindle nut, referred to hereinafter as braking spindle nut 22, is arranged on the first spindle portion 20 and another spindle nut, referred to hereinafter as working spindle nut 23, is arranged on the second spindle portion 21.

A spindle tube 24 is guided in the guide tube 19 so as to be axially movable by the working spindle nut 23. The spindle tube 24 is supported at the working spindle nut 23 by one end and is arranged at a base piece 27 of a second housing part 28 by its other end by a closing element 25 at which a threaded pin 26 is arranged. The base piece 27 and spindle tube 24 are fastened by screwing a connection element 29 on the threaded pin 26 extending through the base piece 27.

The connection elements 10 and 29 can be ball sockets, but knuckle eyes, for example, can also be connected. Alternatively, the connection element can be connected to the base piece so as to be integral with it or can be connected by other joining techniques known to the person skilled in the art, for example, welding or deforming, so that the first driving device 5 can be connected in an articulated manner to a stationary structural component part of the body or base part 1 of a motor vehicle and to a movable structural component part 3 of the motor vehicle that is constructed as a hatch.

A least one axial groove 30 which can be provided with a groove base or can be constructed as an elongated hole is provided in the guide tube 19. A radial projection 31 at the working spindle nut 23 engages in the axial groove 30 so that the working spindle nut 23 is guided so as to be fixed with respect to rotation relative to the guide tube 19.

The braking spindle nut 22 likewise has at least one radial projection 32 on the side facing the working spindle 23, which radial projection 32 engages in the axial groove 30 and accordingly guides the braking spindle nut 22 so as to be fixed with respect to rotation but axially movable with respect to the guide tube 19.

A cylindrical spindle nut portion 33 with reduced outer diameter adjoins the radial projection 32 in direction of the base piece 8 of the first housing part 7 and is bounded by a conical spindle nut portion 34 which forms the transition to a cylindrical spindle portion 35 whose outer diameter is greater than the outer diameter of spindle portion 33.

A braking device 36 is arranged in the first housing part 7 near the guide tube 19. The housing of the braking device 36 is arranged at the inner wall of the housing part 7 of the driving device 5 in such a way that the housing of the braking device 36 is held so as to be fixed with respect to rotation and so as to be fixed in axial direction relative to the housing part 7.

The braking device comprises two spring elements 37, 38 which are preloaded against one another in axial direction and receive an annular braking element 39 between them. The braking element 39 has a sleeve-shaped portion 40 at its side situated toward the longitudinal center line A so that the braking element 39 exhibits a T-shaped profile viewed in section. Further, a freewheel 41 which surrounds the threaded spindle 18 annularly at a certain distance is arranged at the sleeve-shaped portion 40. The inner diameter of the freewheel 41 corresponds to, or is somewhat smaller than, the outer diameter of the spindle nut portion 35.

When the driving device 5 is moved out of its retracted position into the extended position shown in FIG. 2, which corresponds to the opened hatch 3 shown in FIG. 1, the working spindle nut 23 is almost at the end of the second spindle portion 21 and the screw threads of the braking spindle nut 22 are at the end of the first spindle portion 20. At the same time, the spindle nut portion 35 with its relatively larger outer diameter is located in the freewheel 41. The braking force is now applied in the blocking direction of the freewheel 41 and increases the passive movement torque of the spindle drive. In this way, the holding-open force for the movable structural component part 3 in the upper range of the hatch opening angle can be increased by the braking torque in order to allow the movable structural component part 3 to be held open securely.

Figure 3:
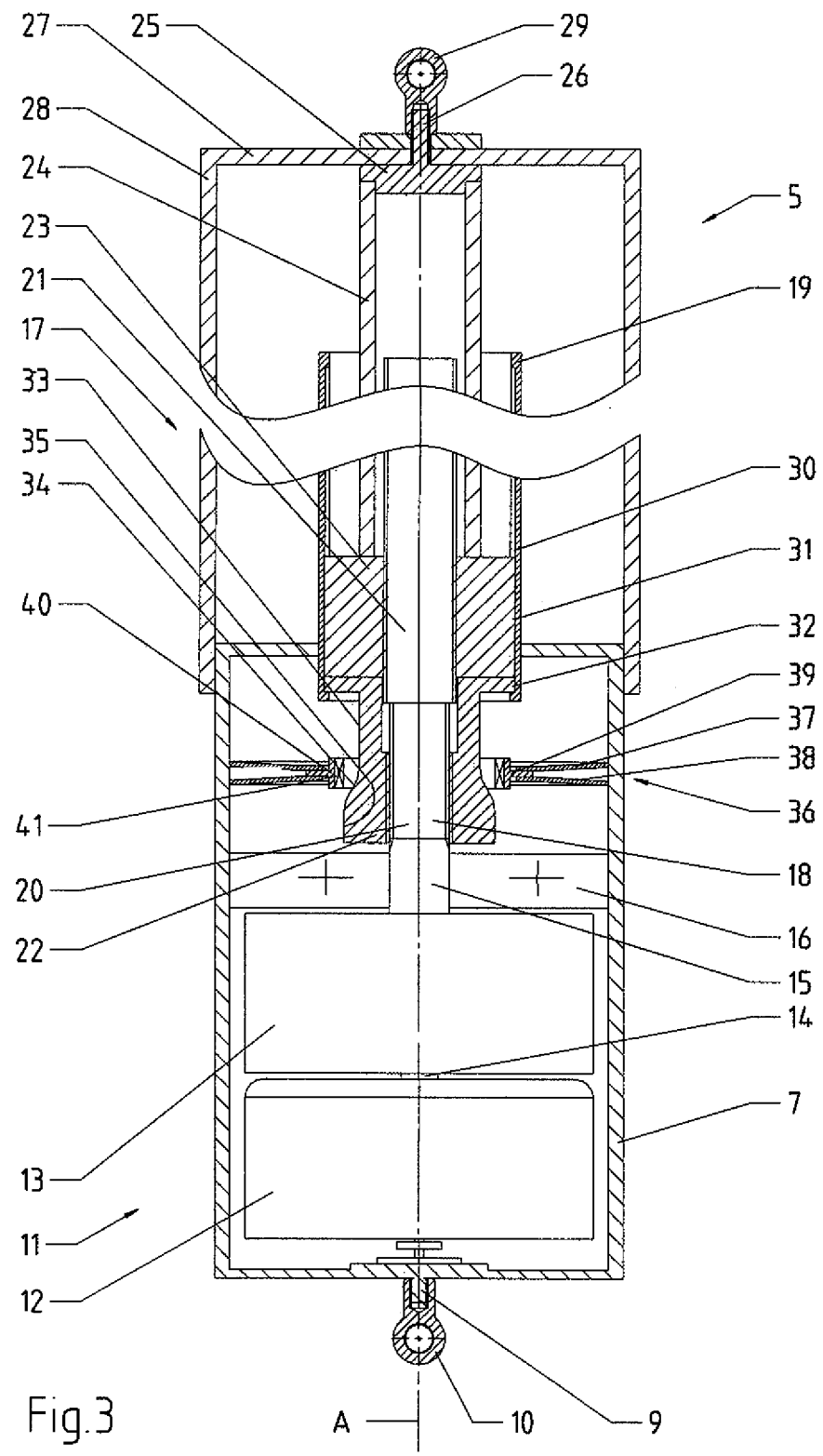
FIG. 3 is a sectional view of the driving device shown in FIG. 2 in a retracted position.

When the driving device 5 is moved out of its extended position into the retracted position shown in FIG. 3, which corresponds to a closed hatch 3, the working spindle nut 23 is at the end of the second spindle portion 21, where it adjoins the first spindle portion 20. The screw threads of the braking spindle nut 22 are at least almost at the end of the first spindle portion 20 where it adjoins the gear shaft 15. The spindle nut portion 33 with its relatively smaller outer diameter is located in the freewheel 41, and the freewheel 41 is not operative.

The braking spindle nut 22 is preferably constructed in such a way that the screw thread, or screw threads, of the braking spindle nut 22 has/have reached the end of the spindle portion 20 at the transition to the second spindle portion 21 in the extended state of the driving device 5, and at least the spindle nut portion 33 is moved along the second spindle portion 21 without cooperating with it.

The lengths and thread pitches of the first and second spindle portions are advantageously selected in such a way that, in the extended position of the drive 5, the working spindle nut 23 is positioned almost at the free end of the second spindle portion 21 and the screw threads of the braking spindle nut 22 are positioned at the end of the first spindle portion 20, and in the closed position of the drive 5 the respective lower end, i.e., the end of the corresponding spindle portions facing the gear unit housing 13, is reached, wherein the working spindle nut 23 and braking spindle nut 22 are at least almost touching in order to make the best possible use of space.

It can be seen that the axial lengths of the spindle nut portions 33 and 35, or their diameter, can be changed for different holding positions of the movable structural component part 3 at which the freewheel 41 should be operative.

Further, it is possible to change the rotating direction of the freewheel in order to prevent the movable structural component part 3 or hatch from running up into the upper hatch opening angle independently in an unwanted manner or, when the construction of the braking spindle nut is modified in a corresponding manner, to prevent the hatch 3 from closing too rapidly, for example, in the lock area, by the brake.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A driving device for a hatch in a vehicle, comprising:
   a first housing part connectable to one of a stationary base part and a movable structural component part of the vehicle;
   a second housing part connectable to the other of the stationary base part and the movable structural component part of the vehicle;
   a spindle drive configured to move the first housing part and the second housing part axially relative to one another, the spindle drive comprises:
      a threaded spindle having a first spindle portion with a first thread pitch and a second spindle portion with a second thread pitch; and
      a braking spindle nut that is axially movable on the first spindle portion; and
      a working spindle nut that is axially movable on the second spindle portion,
      wherein first thread pitch and the second thread pitch are different;
   a rotary drive configured to drive the spindle drive in rotation including:
      a motor; and
      a gear unit accommodated in a gear unit housing; and
   a braking device, wherein the braking spindle nut cooperates with the braking device for applying a holding force to the spindle drive,
   wherein the threaded spindle projects coaxially into a guide tube that extends coaxially out of the first housing part at a side of the first housing part located opposite a base piece and is connected to the first housing part so as to be fixed with respect to rotation relative to it,
   at least one axial groove is provided in the guide tube, and
   a radial projection at the working spindle nut and a radial projection at the braking spindle nut engage in the axial groove.

2. The driving device according to claim 1, wherein the braking device comprises:
   two spring elements that are preloaded against one another in axial direction; and
   an annular braking element received between the two spring elements.

3. The driving device according to claim 2, wherein the braking element comprises a sleeve-shaped portion on a side situated toward a longitudinal center line of the driving device.

4. The driving device according to claim 3, wherein a freewheel that surrounds the threaded spindle annularly at a distance is arranged at the sleeve-shaped portion.

5. The driving device according to claim 1, wherein a spindle nut portion with a reduced outer diameter adjoins the radial projection of the braking spindle nut in a direction of the base piece of the first housing part and is bounded by a conical spindle nut portion forming a transition to a cylindrical nut portion whose outer diameter is greater than the outer diameter of the spindle nut portion.

6. The driving device according to claim 1, wherein lengths and the thread pitches of the first spindle portion and the second spindle portion are selected such that,
   in the extended position of the driving device, the working spindle nut is positioned proximate to a free end of the second spindle portion and screw threads of the braking spindle nut are positioned at an end of the first spindle portion, and
   in the closed position of the driving device a respective lower end is reached.

7. A driving device for a hatch in a vehicle, comprising:
   a first housing part connectable to one of a stationary base part and a movable structural component part of the vehicle;
   a second housing part connectable to the other of the stationary base part and the movable structural component part of the vehicle;
   a spindle drive configured to move the first housing part and the second housing part axially relative to one another, the spindle drive comprises:
      a threaded spindle having a first spindle portion with a first thread pitch and a second spindle portion with a second thread pitch; and
      a braking spindle nut that is axially movable on the first spindle portion; and
      a working spindle nut that is axially movable on the second spindle portion,
      wherein first thread pitch and the second thread pitch are different;
   a rotary drive configured to drive the spindle drive in rotation including:
      a motor; and
      a gear unit accommodated in a gear unit housing; and
   a braking device, wherein the braking spindle nut cooperates with the braking device for applying a holding force to the spindle drive,
   wherein the braking device comprises:
      two spring elements that are preloaded against one another in axial direction;
      an annular braking element received between the two spring elements, and
      a sleeve-shaped portion on a side situated toward a longitudinal center line of the driving device,
   wherein a freewheel that surrounds the threaded spindle annularly at a distance is arranged at the sleeve-shaped portion, and
   wherein the threaded spindle projects coaxially into a guide tube that extends coaxially out of the first housing part at a side of the first housing part located opposite a base piece and is connected to the first housing part so as to be fixed with respect to rotation relative to it,
   at least one axial groove is provided in the guide tube, and
   a radial projection at the working spindle nut and a radial projection at the braking spindle nut engage in the axial groove.

8. The driving device according to claim 7, wherein a spindle nut portion with a reduced outer diameter adjoins the radial projection of the braking spindle nut in a direction of the base piece of the first housing part and is bounded by a conical spindle nut portion forming a transition to a cylindrical nut portion whose outer diameter is greater than the outer diameter of the spindle nut portion.

9. The driving device according to claim 8, wherein lengths and the thread pitches of the first spindle portion and the second spindle portion are selected such that,
- in the extended position of the driving device, the working spindle nut is positioned proximate to a free end of the second spindle portion and screw threads of the braking spindle nut are positioned at an end of the first spindle portion, and
- in the closed position of the driving device a respective lower end is reached.

* * * * *